April 28, 1964  H. B. HINDIN ETAL  3,130,769
HIGH SPEED TIRE

Filed Sept. 5, 1962 2 Sheets-Sheet 1

INVENTOR.
HERBERT B. HINDIN
JOSEPH G. MANCHETTI
BY
*James R. Hulen*
AGENT.

April 28, 1964  H. B. HINDIN ETAL  3,130,769
HIGH SPEED TIRE
Filed Sept. 5, 1962  2 Sheets-Sheet 2
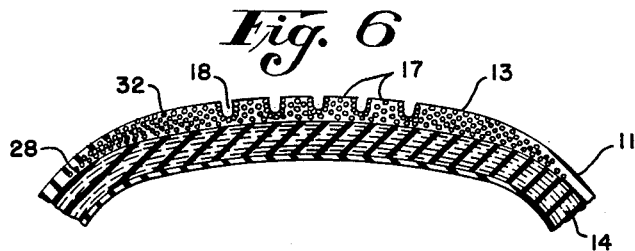
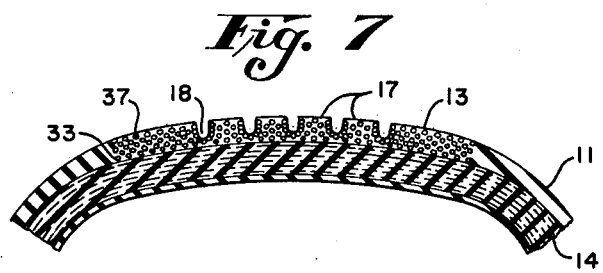
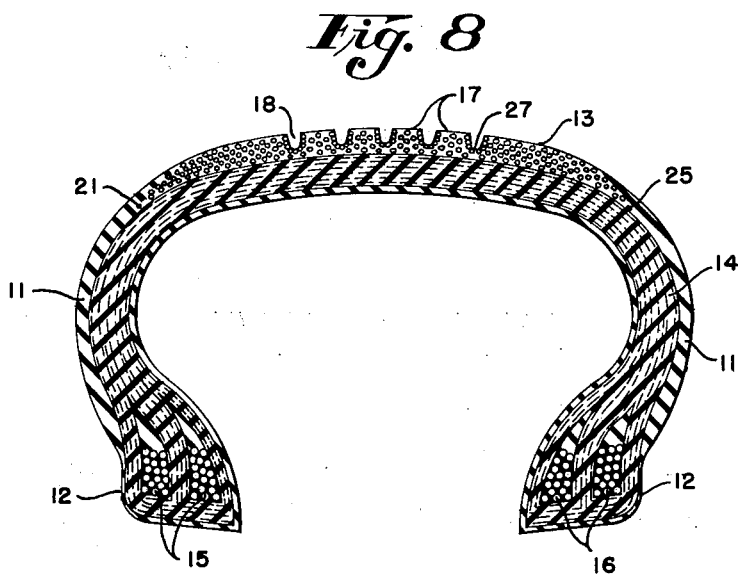
INVENTOR.
HERBERT B. HINDIN
JOSEPH G. MANCHETTI
BY James R. Hulen
AGENT.

United States Patent Office 3,130,769
Patented Apr. 28, 1964

3,130,769
HIGH SPEED TIRE
Herbert B. Hindin, Southfield, and Joseph G. Manchetti, St. Clair Shores, Mich., assignors to United States Rubber Company, New York, N.Y., a corporation of New Jersey
Filed Sept. 5, 1962, Ser. No. 221,523
9 Claims. (Cl. 152—356)

This invention relates to a new tire construction and particularly to a tire tread useful in very high speed tires.

Standard carcass designs with unreinforced rubber treads have performed adequately in aircraft and other high speed tires when ground speeds below 200 miles per hour were required. As ground speeds were increased to more than 200 miles per hour the high speeds and centrifugal forces caused tread separation failures in rubber tread tires. Performance was improved to a satisfactory level for speeds of up to 250 miles per hour and in some cases even up to 275 miles per hour through the use of several reinforcing plies of bias angle fabric embedded in the tread. This fabric in the tread reduced tread stretch, increased stability, and provided a gradual change in elasticity through the depth of the tread.

Aircraft and other high speed tires are now required to perform at speeds in excess of 275 miles per hour with very high constant loads which result in large carcass deflections. This further increase in requirements has resulted in inadequate performance from the various tires including the bais angle fabric reinforced tread design.

It is an object of the present invention, therefore, to provide a new and improved tire which will perform well at very high speeds.

In accordance with the invention, a high speed tire comprises a generally toroidal carcass and a tread comprised of circumferential layers formed from a continuous sheet of rubber coated cord fabric, the cords of said fabric extending substantially in the longitudinal plane of said tire.

For a better understanding of the present invention, together with other and further objects thereof, reference is made to the following desecription, taken in connection with the accompanying drawings, and its scope will be pointed out in the appended claims.

Referring now to the drawings:

FIG. 6 is a section taken along line 2—2 of FIG. 2 and corresponding to the FIG. 4 embodiment.

FIG. 7 is a section taken along line 2—2 of FIG. 2 and corresponding to the FIG. 5 embodiment.

FIG. 8 is a section taken along line 2—2 of FIG. 2 and corresponding to the FIG. 3 embodiment.

Figure 2:
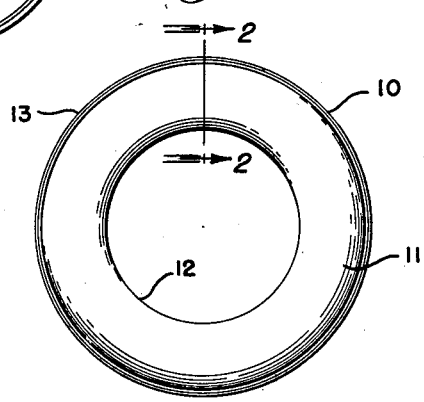
FIG. 2 is an elevational view of a tire constructed in accordance with and embodying the invention.

Referring now to the drawings and more particularly to FIG. 2, there is shown a tire 10 which is of the standard straight-sidewall type which comprises a sidewall 11, bead portion 12 and tread 13. The FIG. 8 sectional view along line 2—2 of FIG. 2 illustrates the details of the tire construction. The toroidal carcass 14 is constructed of rubber and reinforcing cord fabric. The cords of said fabric extend transversely of the tire and the carcass plies extend through the tire body from bead wires 15 to bead wires 16. A sidewall 11 is made of rubber and covers the outer portion of carcass 14 from the bead portions 12 to the tread 13.

The preferred tread design is illustrated in FIGS. 6, 7 and 8 which shows the tread 13 as having a generally arcuate shape with circumferentially extending ribs and grooves 17 and 18, respectively.

Figure 3:
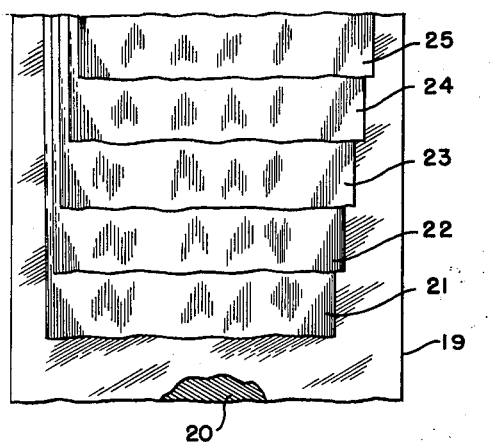
FIG. 3 is a plan view of one embodiment of the tire of FIG. 2 showing the relative position of the cords in the tread with respect to the cords in the carcass and the position of the tread layers relative to each other.

Referring now to the presently preferred embodiment of the tread construction as illustrated by FIG. 3, the most radially outwardly spaced carcass ply is shown at 19 and a cut-away portions shows the next inwardly spaced carcass ply at 20. As shown, the cords of the carcass plies 19 and 20 are arranged transverse to the tire at an angle of approximately 30° to 35° to the longitudinal direction of the tire.

Tread 13 comprises a plurality of layers 21, 22, 23, 24 and 25 of a continuous rubber coated cord fabric. Any typical aircraft cord fabric, such as nylon, may be used with this invention. The term "cord" as used in this specification is intended to include single filaments of nylon, wire or other suitable materials as well as a plurality of twisted or woven filaments of said materials. The layers are formed from a single sheet of fabric in which the cords extend longitudinally in the fabric, and therefore, the cords will also extend substantially longitudinally of the tire when the fabric is applied around the circumference of the tire. In the construction of the tread in the FIG. 3 embodiment the fabric is spirally applied to the carcass and a very slight angle (approximately 0° 15 minutes) of the cord to the longitudinal plane of the tire will result. As shown in FIG. 8, the spiral tread 13 provides a step-off at each side of the tire since layer 21 extends more closely than the other layers to bead wires 15 on one side of the tire and layer 25 extends more closely to bead wires 16 on the other side of the tire.

Figure 1:
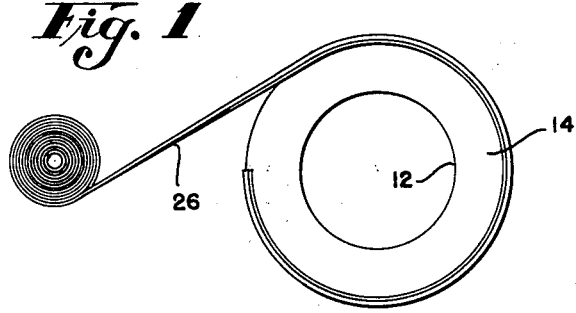
FIG. 1 is an elevational view of a tire during construction in accordance with the invention.

The application of rubber skim-coated fabric to the carcass is illustrated diagrammatically by FIG. 1 wherein the carcass 14 and bead portions 12 of the tire are constructed as a complete unit and shaped to torodial form prior to the application of the tread. The tread fabric 26 is then applied around the circumference of the carcass to form a plurality of layers—the number of layers being determined by the tire size and performance required. After the desired number of layers of the continuous sheet fabric have been applied and the sidewall rubber has been arranged in place, the entire unit is placed in a mold to vulcanize the tire and impart the desired pattern to the tread. As shown at 27 in FIG. 8, the molding of grooves 18 forces the fabric beneath the grooves to conform to the groove contour and to reinforce the adjacent areas.

In the case of usual tire cord materials, such as nylon, the limited cord extension prohibits the application of the tread on the carcass building drum. The expansion of the tire carcass on shaping is generally greater than can be tolerated by the circumferentially wound cord fabrics.

In the above tire building method the carcass is usually shaped to a diameter of approximately 2 to 7%, depending on tire size, less than it would have in the mold and the tread fabric wound directly on the shaped carcass. Other tire building methods are possible and have been successfully performed. In a second method, the carcass and tread are built separately on different drums. The tread is built to a diameter slightly smaller than the mold so that the tread cords undergo an expansion of about 2–7%, depending on tire size, during the final shaping when the carcass is expanded to meet the tread. In a third method, fabrics with very high extension (50%) may be applied directly on the carcass prior to shaping and then the entire assembly placed in a mold.

It is significant that the tire tread 13 consists entirely of skim-coated layers 21 to 25 and that no additional layers of rubber or other materials are necessary for the desired performance and efficiency of the tire. If requirements dictate, however, it is possible to alter the tire construction by adding additional rubber to the tread or by applying an outer layer of rubber or reinforced rubber to layer 25.

Figure 4:
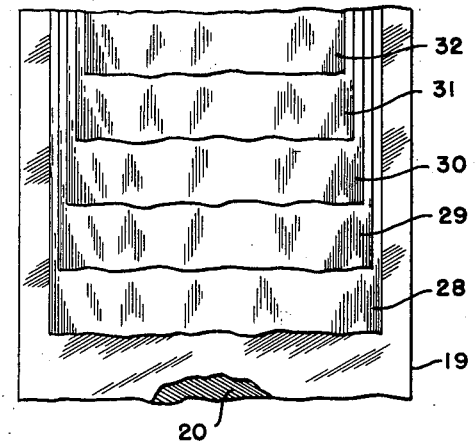
FIG. 4 is a plan view of a second embodiment of the tire of FIG. 2 showing the relative position of the cords in the tread with respect to the cords in the carcass and the position of the tread layers relative to each other.

The FIG. 4 embodiment and corresponding sectional view of FIG. 6 is constructed in much the same manner as the FIG. 3 embodiment. In this case, the initial layer 28 of rubber skim-coated fabric of a desired width is applied to the circumference of the outer carcass layer 19. On the subsequent layers of fabric 29 to 32, cords are removed from each side of the fabric as a complete revolution of the fabric around the tire carcass is made. In other words, the width of the fabric sheet is decreased toward the outer periphery of the tread for each subsequent layer. As shown in FIG. 6, this tread construction results in a step-off of the tread as additional layers are added thereto.

Figure 5:
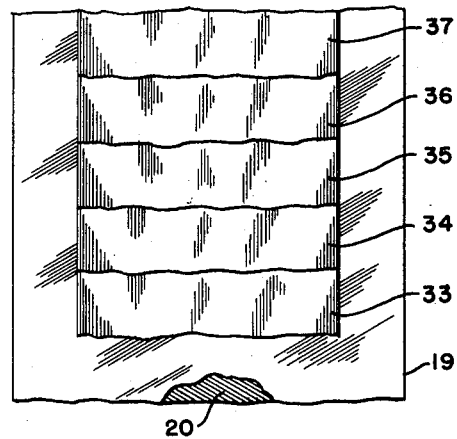
FIG. 5 is a plan view of a third embodiment of the tire of FIG. 2 showing the relative position of the cords in the tread with respect to the cords in the carcass and the position of the tread layers relative to each other.

In the embodiment of FIG. 5 and the sectional view of FIG. 7 corresponding thereto, fabric layers 33, 34, 35, 36 and 37 are of constant width and are applied directly on top of one another as a continuously wound strip. The initial layer 33 is applied circumferentially of the tire directly on the outer carcass layer 19 and the subsequent layers 34 to 37 are wound over layer 33.

In all of the above embodiments it is important to note that the cords in all layers of the tread fabric extend circumferentially of the tire and at an angle of substantially 0° to the circumferential center line of the tire.

While there has been described what is at present considered to be preferred embodiments of this invention, it will be obvious to those skilled in the art that various changes and modifications may be made therein without departing from the invention, and it is, therefore, aimed to cover all such changes and modifications as fall within the true scope and spirit of the invention.

Having thus described our invention, what we claim and desire to protect by Letters Patent is:

1. A high speed pneumatic tire comprising a generally toroidal carcass and a tread consisting of a plurality of layers of rubber skim-coated cord fabric, said layers comprising a continuous sheet of said fabric applied circumferentially of said carcass.

2. A high speed pneumatic tire comprising a generally toroidal carcass and a tread consisting of a plurality of layers of rubber skim-coated cord fabric, said layers comprising a continuous sheet of said fabric applied circumferentially of said carcass and the cords of said fabric extending longitudinally of said tire.

3. The tire of claim 1 wherein said layers are of uniform width and applied to said carcass at a spiral angle.

4. The tire of claim 1 wherein said layers are of uniform width and each layer applied to said carcass directly on top of the preceding layer.

5. The tire of claim 1 wherein said layers are of varying widths.

6. A high speed pneumatic tire comprising a generally toroidal carcass, said carcass having substantially inextensible bead portions and a tread comprised solely of a plurality of layers of rubber skim-coated cord fabric.

7. A high speed pneumatic tire comprising a generally toroidal carcass, said carcass having substantially inextensible bead portions, and a tread comprised solely of a plurality of layers of rubber skim-coated cord fabric, said layers being formed from a continuous sheet of said fabric applied circumferentially about said carcass.

8. A high speed pneumatic tire comprising a generally toroidal carcass, said carcass having substantially inextensible bead portions, and a tread comprised solely of a plurality of layers of rubber skim-coated cord fabric, the cords in said fabric extending substantially circumferentially of said carcass.

9. A high speed pneumatic tire comprising a generally toroidal carcass, said carcass having substantially inextensible bead portions, and a tread comprised solely of a plurality of layers of rubber skim-coated cord fabric, said layers being formed from a continuous sheet of said fabric applied circumferentially about said carcass, the cords in said fabric extending substantially circumferentially of said carcass.

References Cited in the file of this patent
UNITED STATES PATENTS

| | | |
|---|---|---|
| 1,264,567 | Smith | Apr. 30, 1918 |
| 2,059,982 | Budd | Nov. 3, 1936 |
| 2,849,049 | Hanson | Aug. 26, 1958 |
| 2,943,663 | Antonson | July 5, 1960 |
| 2,982,328 | Emanueli et al. | May 2, 1961 |